(12) United States Patent
Holland et al.

(10) Patent No.: US 9,099,801 B2
(45) Date of Patent: Aug. 4, 2015

(54) SHORT CIRCUIT PROTECTION FOR ELECTRIC CIGAR LIGHTER AND POWER OUTLET SOCKETS

(71) Applicants: Gregory J. Holland, New Haven, CT (US); Ali El-Haj, Easton, CT (US); Salmen Abroug, Ariana (TN)

(72) Inventors: Gregory J. Holland, New Haven, CT (US); Ali El-Haj, Easton, CT (US); Salmen Abroug, Ariana (TN)

(73) Assignee: Casco Products Corporation, Bridgeport, CT (US)

( * ) Notice: Subject to any disclaimer, the term of this patent is extended or adjusted under 35 U.S.C. 154(b) by 0 days.

(21) Appl. No.: 14/087,611

(22) Filed: Nov. 22, 2013

(65) Prior Publication Data

US 2015/0146411 A1 May 28, 2015

(51) Int. Cl.
*H02H 3/00* (2006.01)
*H01R 13/44* (2006.01)
*H01R 13/639* (2006.01)
*H01R 13/717* (2006.01)

(52) U.S. Cl.
CPC .............. *H01R 13/44* (2013.01); *H01R 13/639* (2013.01); *H01R 13/717* (2013.01)

(58) Field of Classification Search
CPC .................................................. H01L 27/0248
USPC ............................................................ 361/1
See application file for complete search history.

(56) References Cited

U.S. PATENT DOCUMENTS 4,037,901 A * 7/1977 Kaszuba ....................... 439/138
4,123,648 A 10/1978 Clark
5,044,993 A 9/1991 El-Haj et al.
5,403,996 A * 4/1995 Mattis et al. ................... 219/265
5,796,073 A * 8/1998 Mattis et al. ................... 219/265
6,619,983 B2 9/2003 Ota et al.
6,682,356 B2 1/2004 Erez et al.
6,743,056 B2 6/2004 Kunugi (Continued)

FOREIGN PATENT DOCUMENTS

| CN | 2010038435 | 3/2008 |
| DE | 4436794 | 10/1994 |
| WO | WO-2013/088857 | 6/2013 |

OTHER PUBLICATIONS

International Search Report and Written Opinion dated Mar. 24, 2015 in related PCT International Application No. PCT/US14/66624.

*Primary Examiner* — Stephen W Jackson
(74) *Attorney, Agent, or Firm* — Ostrolenk Faber LLP

(57) ABSTRACT

An electrical power socket comprising a well having an electrically conductive well portion having a proximal and a distal end; a connector part for receiving electrical connections to an electrical power supply disposed at the distal end of the well portion; a first electrical contact being provided in electrical isolation from the well portion at the distal end of the well portion, the first electrical contact being electrically connected to a first electrical connection of the connector part; the well portion being electrically connected to a second electrical connection of the connector part; and an electrically insulating sleeve portion being provided at the proximal end of the well portion forming an electrically insulating portion of the well, the sleeve portion adapted to be disposed in an opening in a receiving panel, whereby the insulating sleeve portion prevents an electrically conductive foreign object that is inserted in the well and electrically contacts the first electrical contact from simultaneously making electrical contact with the electrically conductive well portion.

23 Claims, 17 Drawing Sheets

(56) References Cited

U.S. PATENT DOCUMENTS

| | | |
|---|---|---|
| 7,063,447 B2 | 6/2006 | Andrieu et al. |
| 7,193,182 B2 | 3/2007 | Can et al. |
| 7,438,602 B2 | 10/2008 | Montgomery et al. |
| 8,215,999 B2 | 7/2012 | Lau et al. |
| 2013/0084748 A1 | 4/2013 | Zaderej et al. |

* cited by examiner

FIG. 11  INSTALLATION DIRECTION

HEAT STAKED ATTACHMENT
WELL

WELL INSERT MOLDED ATTACHMENT

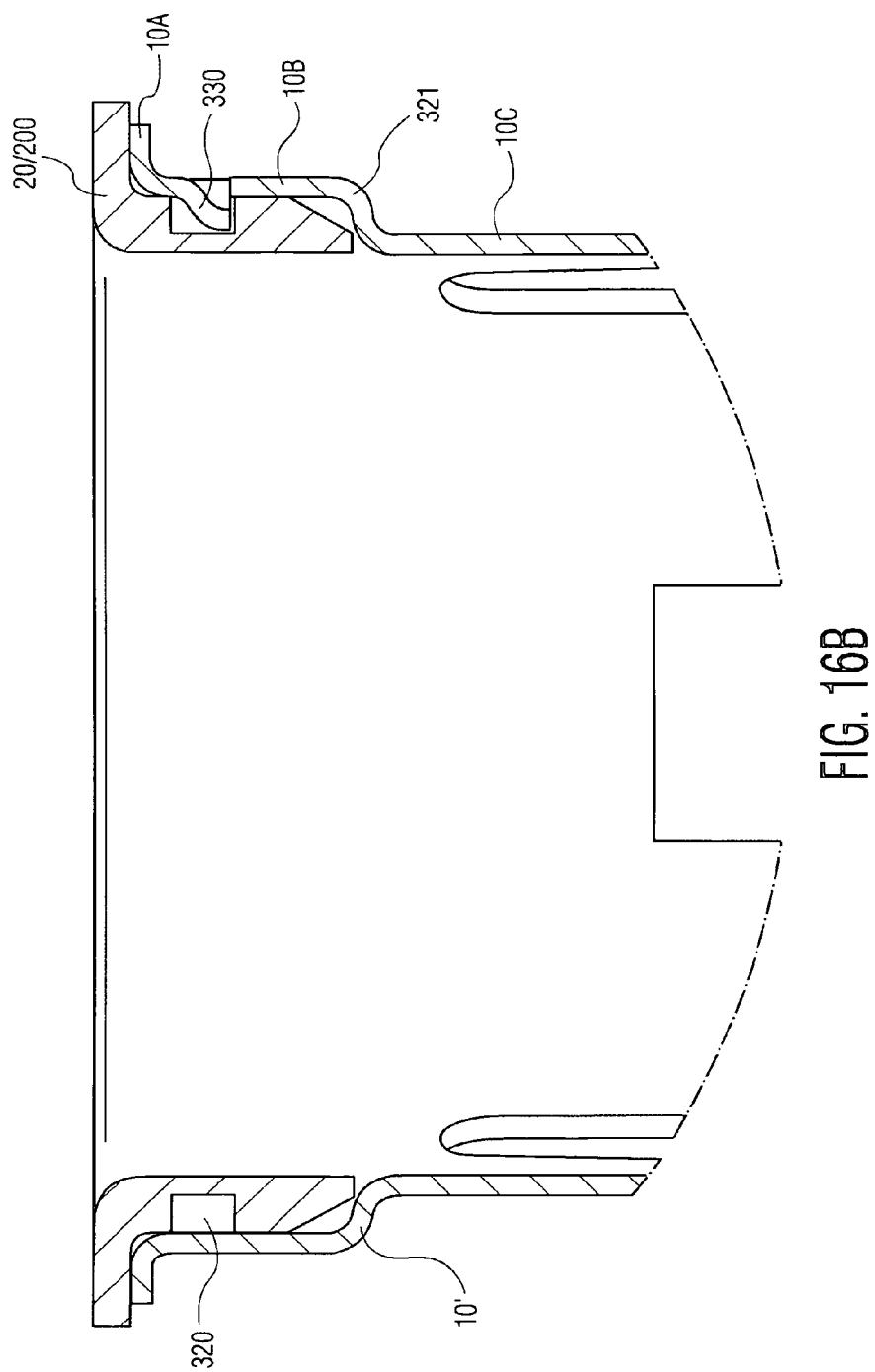

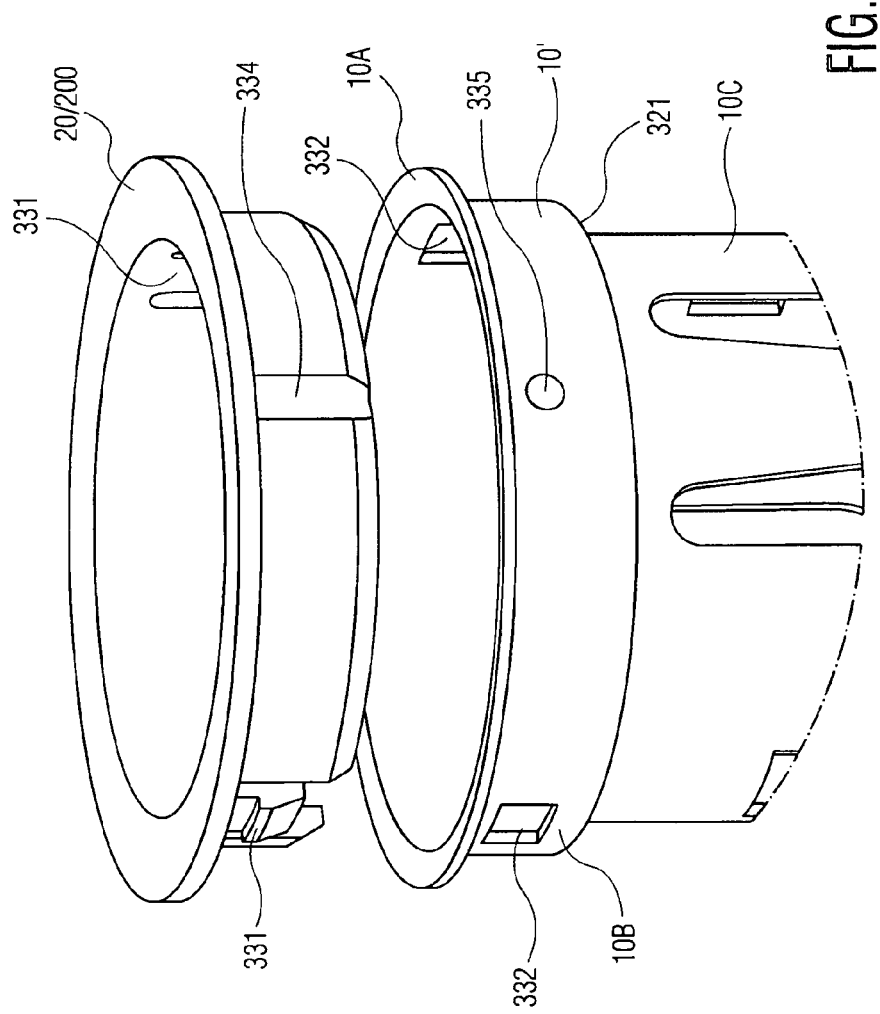

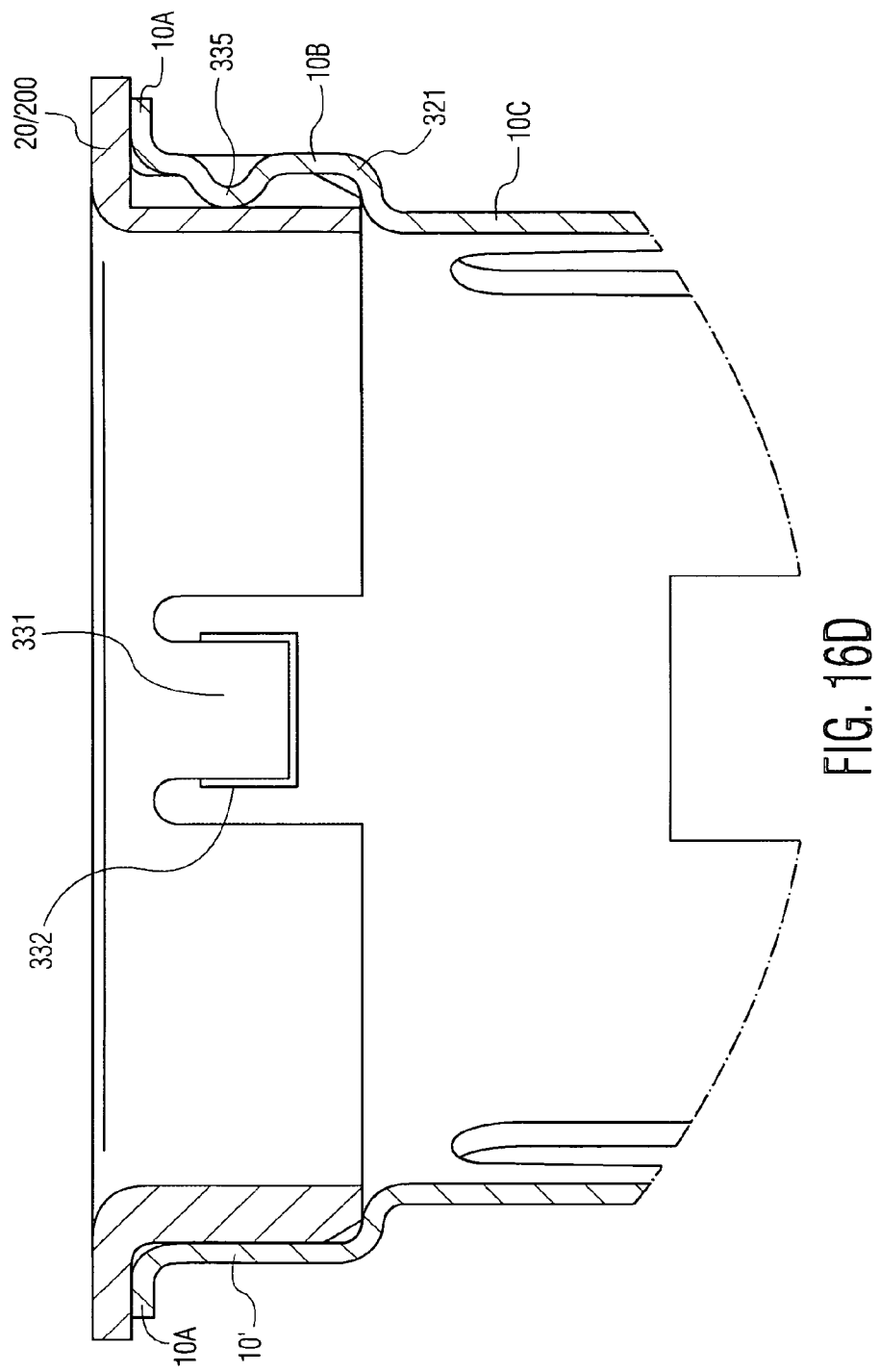

SHORT CIRCUIT PROTECTION FOR ELECTRIC CIGAR LIGHTER AND POWER OUTLET SOCKETS

BACKGROUND OF THE INVENTION

The present invention is directed to electric cigar lighter and power outlet sockets generally, and in particular, such cigar lighter sockets and power outlets that are used in automotive applications.

The invention provides a structure to prevent the occurrence of electrical short circuits in an electrical cigar lighter or electric power outlet socket, commonly found in vehicles, when foreign electrically conductive objects are intentionally or unintentionally placed within the socket and simultaneously touch surfaces that are at different electrical potentials.

FIG. 1 shows a prior art electrical socket for an automobile. The socket might comprise an electrical power outlet for powering portable electrical devices such as computers or charging devices or the electrical socket for a cigar lighter.

As shown in FIG. 1, the outlet comprises a socket well portion 1 and a connector portion 2.

The socket well portion 1 comprises a conductive metal well and the connector portion 2 comprises a plastic insulating member 2A having at least one electrical terminal and generally two terminals 3 and 4, one connected to the vehicle's positive electrical supply and the other connected to the vehicle ground. The metal socket well portion 1 is connected to the electrical terminal generally connected to the vehicle ground.

Typically, the well portion 1 contains an insulating member 5 at the distal end or bottom of the well portion which is riveted to the connector portion 2 by a rivet 6. The rivet 6 is connected to the positive supply terminal and functions as the positive side electrical contact or bears a contact member that engages with a lighter contact or an electrical plug contact that is inserted into the well portion.

When a plug or cigar lighter is inserted into the socket, one contact of the plug engages electrically with the contact rivet 6 or a contact terminal electrically connected to the rivet 6. The other terminal of the plug or cigar lighter electrically engages with the conductive wall of the well portion 1. The assembly shown in FIG. 1 is generally mounted in a mounting ring that is typically made of a plastic material. The mounting ring is inserted into an opening in the panel of the vehicle to hold the power socket or cigar lighter socket in position in the vehicle. The mounting ring may be illuminated and may act as a light transmissive member to aid in locating the socket in a darkened automobile interior.

As shown in FIG. 1, an electrically conducting foreign object, for example, a key 13 or another metallic object, for example, a metallic pen or a metal tool, may intentionally or unintentionally be inserted into the socket. It is then possible to electrically short circuit the socket as shown by the key in FIG. 1 making contact with the positive contact 6 at the same time that it is electrically in contact with the socket well portion 1. This results in a short circuit, typically blowing the vehicle fuse which must be then replaced.

It is an object of the present invention to provide an improved power socket or electrical cigar lighter socket that reduces the possibility of electrical short circuits being created by electrically conductive objects being intentionally or unintentionally inserted into the socket.

SUMMARY OF THE INVENTION

The above and other objects of the invention are achieved by an electrical power socket comprising a well having an electrically conductive well portion having a proximal and a distal end; a connector part for receiving electrical connections to an electrical power supply disposed at the distal end of the well portion; a first electrical contact being provided in electrical isolation from the well portion at the distal end of the well portion, the first electrical contact being electrically connected to a first electrical connection of the connector part; the well portion being electrically connected to a second electrical connection of the connector part; and an electrically insulating sleeve portion being provided at the proximal end of the well portion forming an electrically insulating portion of the well, the sleeve portion adapted to be disposed in an opening in a receiving panel, whereby the insulating sleeve portion prevents an electrically conductive foreign object that is inserted in the well and electrically contacts the first electrical contact from simultaneously making electrical contact with the electrically conductive well portion.

BRIEF DESCRIPTION OF THE DRAWINGS

The invention will now be described in greater detail in the following Detailed Description with reference to the drawings in which:

FIGS. 16A and 16B show another embodiment of the mounting of the isolation sleeve in the socket well using a snap-in fit; and FIGS. 16C and 16D show yet another embodiment of the mounting of the isolation sleeve in the socket well using a snap-in fit.

Other advantages and objects of the invention will be apparent from the Detailed Description that follows.

DETAILED DESCRIPTION OF EMBODIMENTS OF THE INVENTION

The present invention provides an electrical lighter socket or an electrical power outlet socket, commonly found in a vehicle, such as an automobile, comprising a socket having features that include a non-conductive electrical isolation sleeve member that prevents foreign electrically conductive members from shorting the positive electrical potential contact or contacts to a ground electrical contact of the electrical socket.

Figure 2:
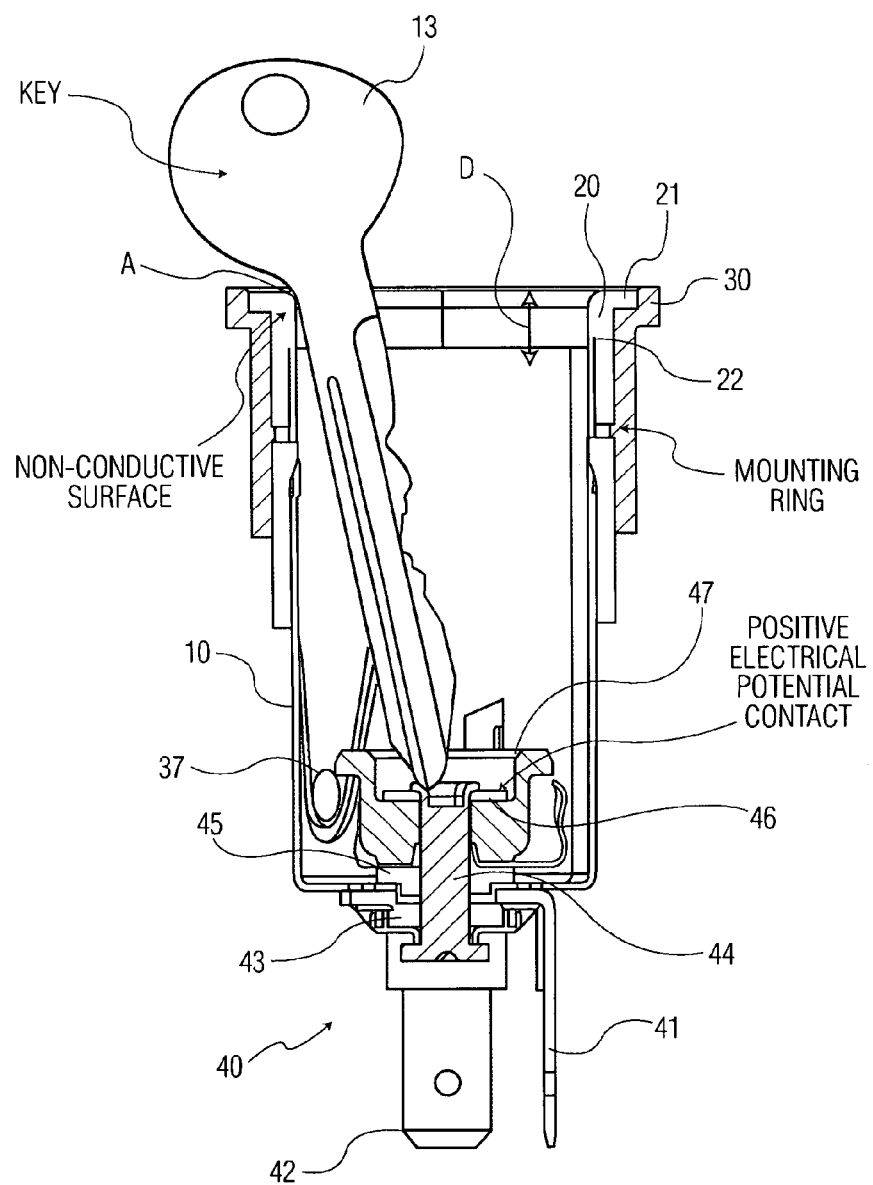
FIG. 2 shows a cut-away view of a preferred embodiment of the socket according to the present invention into which a foreign electrically conductive object has been inserted but which prevents a short circuit.

FIG. 2 shows a cut-away view of a preferred embodiment of the present invention showing how it prevents such short circuit.

The socket according to a first embodiment of the present invention comprises an electrically conductive socket well portion 10 that mounts in an electrically insulating upper isolation sleeve (UIS) 20. The isolation sleeve 20, in this embodiment, is retained within a mounting ring 30 that mounts into an opening in vehicle panel.

The socket well portion 10 is made of an electrically conductive material, for example, steel, plated steel or another electrically conductive metal. The socket furthermore comprises a connector portion 40 that has at least one and usually two electrical terminals 41 and 42, one of which is connected to the vehicle's positive electrical supply and the other connected to the vehicle ground, which is generally connected to the vehicle chassis.

The positive terminal 42 is fastened to a rivet 44 which is provided through insulators 43 and 45 so that it does not contact the socket well portion 10. The ground connector 41 is electrically connected to the socket well portion 10 and insulated from the rivet 44 also by the insulators 43 and 45. The rivet 44 is fastened to a positive electrical potential contact 46 which is contained in an insulating member 47. The positive contact 46 can take various forms. If the socket is being employed as an electrical power outlet for powering electrical devices utilized in vehicles, such as, for example, electrical chargers for electronic devices or other electrical devices, an electrical plug is inserted into the socket and a central contact of the plug makes contact with the central electrical contact 46 whereas spring loaded members that are typically found on the sides of the plug made contact with the wall of the well portion 10 to provide the return ground contact. If the socket is the socket of an electrical cigar lighter, the socket may have a bi-metallic element electrically connected to the rivet 44 which allows the cigar lighter to be disconnected from the electrical supply when it has reached the necessary ignition temperature.

Figure 1:
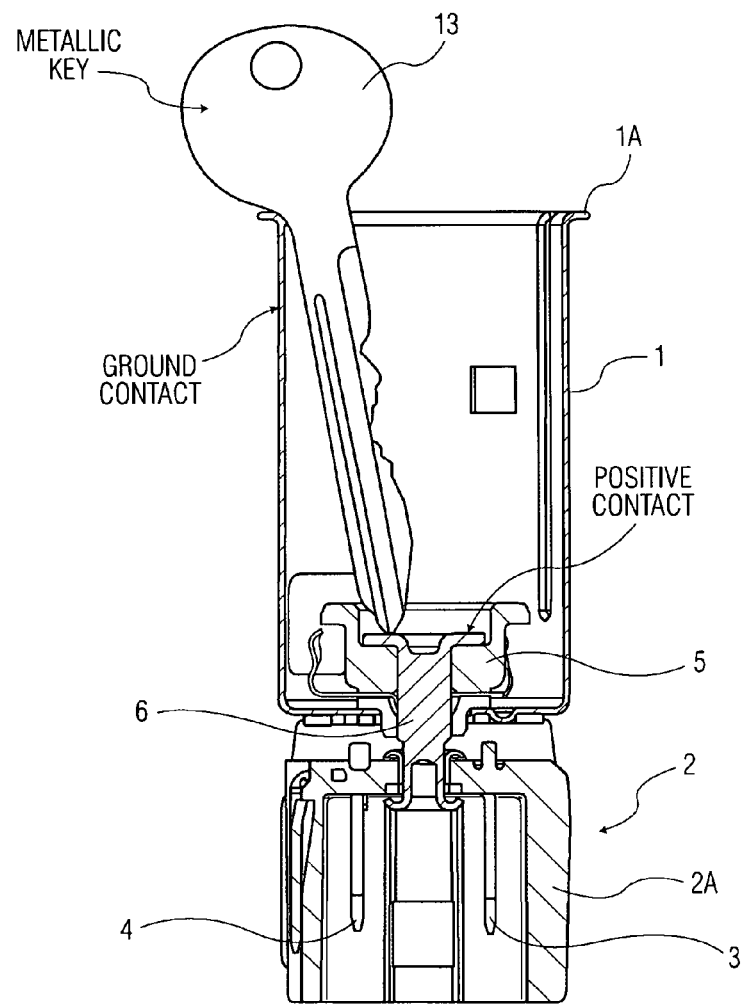
FIG. 1 shows a cut-away view of a prior art socket into which a foreign electrically conductive object has been inserted, resulting in a short circuit.

The isolation sleeve 20 engages with the metallic socket well portion 10 by suitable engaging means, to be explained in greater detail below. The socket well portion 10, in contrast to the prior art shown in FIG. 1, does not extend to the proximal-most end of the socket, that is, to the socket well opening and does not have a proximal flange. Instead, the socket well portion 10 terminates within the isolation sleeve 20 a distance D below the outermost portion of the isolation sleeve 20. The isolation sleeve 20 forms a flange 21. In contrast, in the prior art shown in FIG. 1, the metal socket well portion 1 has a flange 1A that forms the outermost part of the socket well.

As shown in FIG. 2, the result of the invention is that if a metallic object 13 is inserted into the socket as shown, and contacts the positive contact 46 and/or rivet 44 and simultaneously contacts the outermost edge of the socket well as shown at A in FIG. 2, because the isolation sleeve is non-conductive, a short circuit will not be developed. As shown, the isolation sleeve 20 preferably includes a recessed undercut area on its inner diameter as shown at 22, into which the socket well portion 10 is seated, thus recessing the socket well portion 10 in the isolation sleeve 20 so that is it flush with the internal diameter of the isolation sleeve 20 to promote smooth entry of a plug or lighter and also reduce the risk of electrical contact with foreign conductive objects.

Figure 3A:
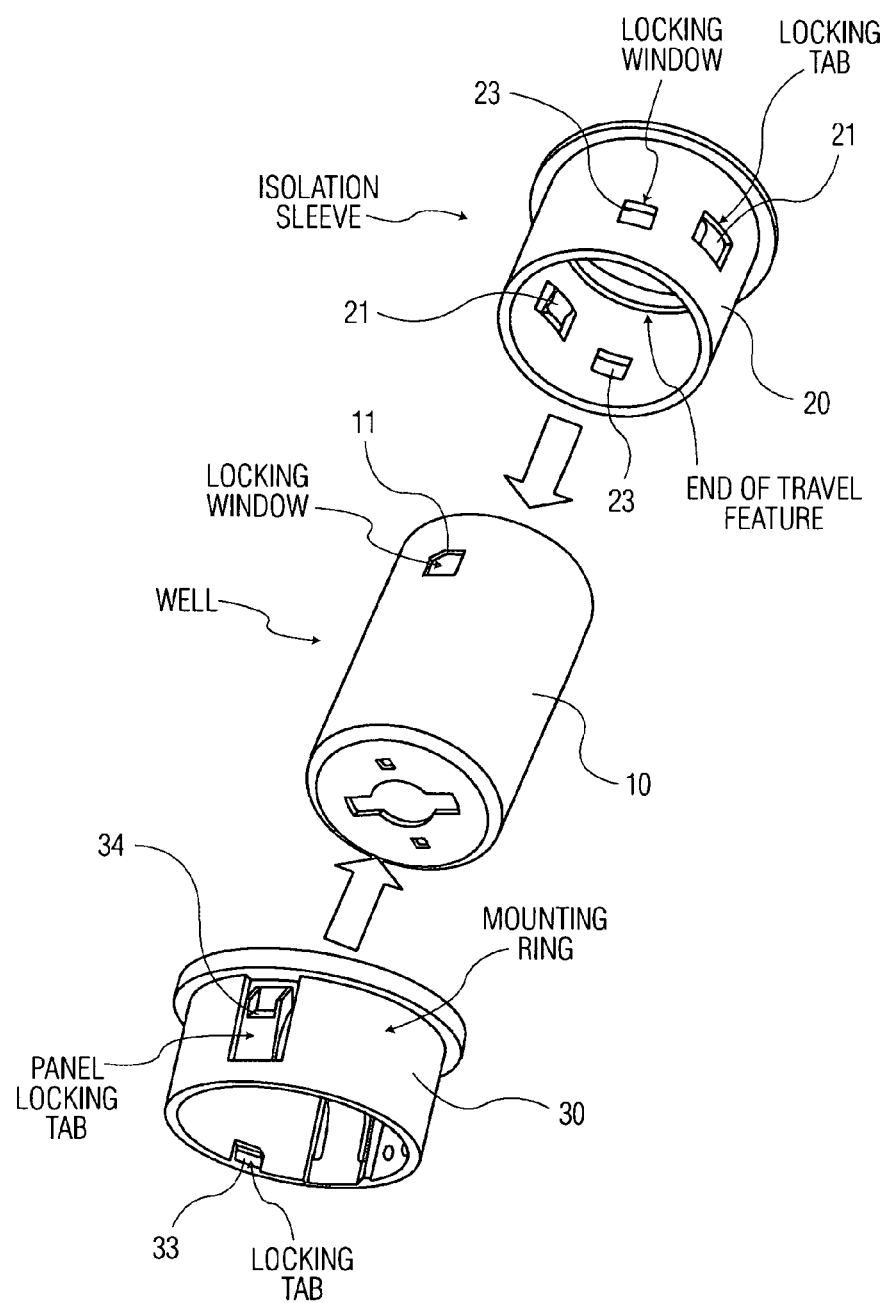
FIG. 3A shows an exploded view of the preferred embodiment of the present invention.

FIG. 3A shows an exploded view of the invention. In particular, FIG. 3A shows how the isolation sleeve 20, metallic well portion 10 and mounting ring 30 are assembled. The isolation sleeve 20 is aligned and inserted onto the well portion 10. The well portion 10 includes at least one locking window 11 which engages with a flexible radially inwardly directed locking tab 21 molded into the isolation sleeve 20. Two such locking windows and locking tabs are preferably provided. When the well portion 10 is inserted into the isolation sleeve 20, the locking tabs 21, which are projections directed radially inwardly, flex over the well and snap into the locking windows 11 securely holding the well portion 10 in the sleeve 20.

Figure 3B:
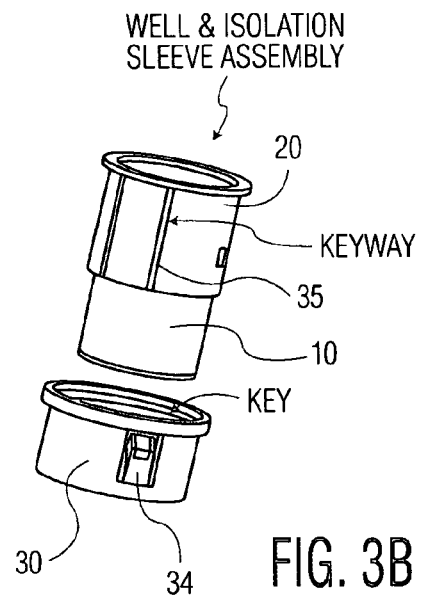
FIG. 3B shows the assembled well and upper isolation sleeve (UIS) prior to insertion in the mounting ring.

As shown in FIG. 3B, the assembled socket well portion 10 and isolation sleeve 20 are assembled into the mounting ring 30, which is typically disposed in an opening in panel of a vehicle. Prior to insertion into the mounting ring 30, the well portion and isolation sleeve assembly that is shown in FIG. 3B, has attached thereto the connector portion 40 and the electrical contacts as shown in FIG. 2, so that the device comprises an electrical power outlet or electrical socket for a cigar lighter.

Then, the assembly comprising the sleeve 20 and well portion 10 with connector part 40 is inserted into the vehicle panel into the pre-mounted mounting ring 30 which can also function as an illumination ring. As shown in FIG. 3B, the socket comprising the well portion and isolation sleeve assembly is inserted from the front of the panel into the mounting ring. The proximal band of nonconductive surface formed by the isolation sleeve 20 inhibits the short circuit potential due to foreign objects being inserted into the socket.

The isolation sleeve 20 mounts in the mounting ring 30 similarly to the way that the well portion 10 mounts in the isolation sleeve 20. The isolation sleeve includes a keying member 35 such as a slot or projection that is received in or on a mating keying member provided in the interior of the mounting ring for alignment. The isolation sleeve includes locking windows 23 which engage with radially inwardly directed flexible locking tabs 33 provided on the inner diameter of the mounting ring. The mounting ring 30 further includes locking tabs 34 which are provided to snap into place once the mounting ring is inserted into the panel opening thereby to secure the mounting ring in position in the panel against removal, and thus secure the entire socket assembly in the panel.

Figure 4:
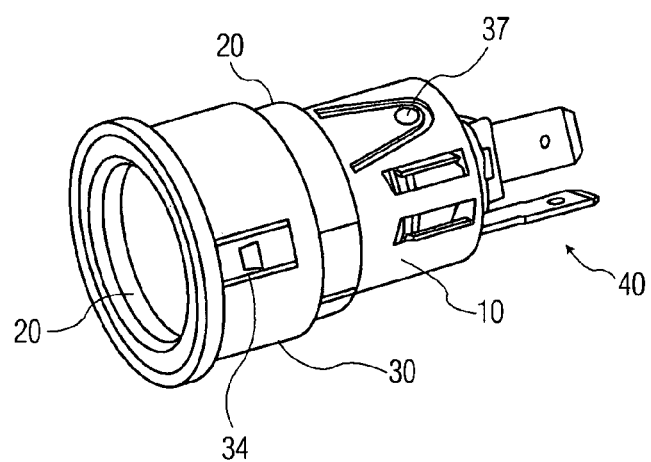
FIG. 4 shows a perspective assembled view of the preferred embodiment of the present invention.

FIG. 4 shows a perspective view of the assembled socket including the connector portion 40. The assembled arrangement of the well portion 10, the isolation sleeve 20 and the mounting ring 30 can be seen in this perspective view. From the opening in the front of the socket, the nonconductive surface of the isolation sleeve 20 that prevents a short circuit can be seen.

The well portion 10 includes spring loaded cut-out fingers 37 for providing tension against an electrical plug inserted into the socket to assist in retention of the plug.

Figure 5:
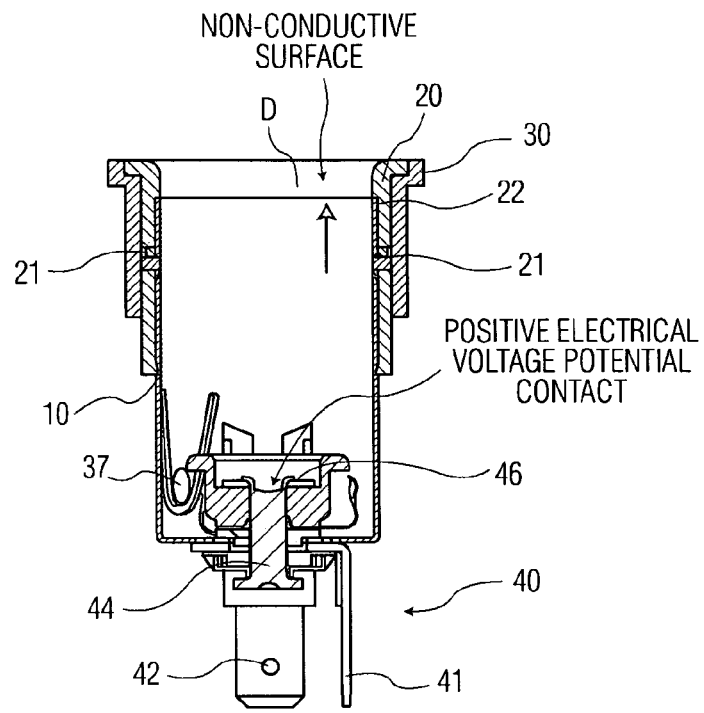
FIG. 5 shows a cut-away view of the preferred embodiment of the present invention.

FIG. 5 shows a cut-away view of the assembly. The locking tabs 21 of the isolation sleeve 20 that lock into the openings 11 of the socket well portion are visible in this view.

As shown in FIG. 5, the isolation sleeve 20 has the recessed undercut 22 having a stop shoulder around its inner surface, that does not extend all the way to the opening. This prevents the well portion 10 from extending outwardly (end of travel feature) and also provides a flush fit of the inner diameter of the well portion 10 with the inner diameter of the isolation sleeve 20.

Figure 6:
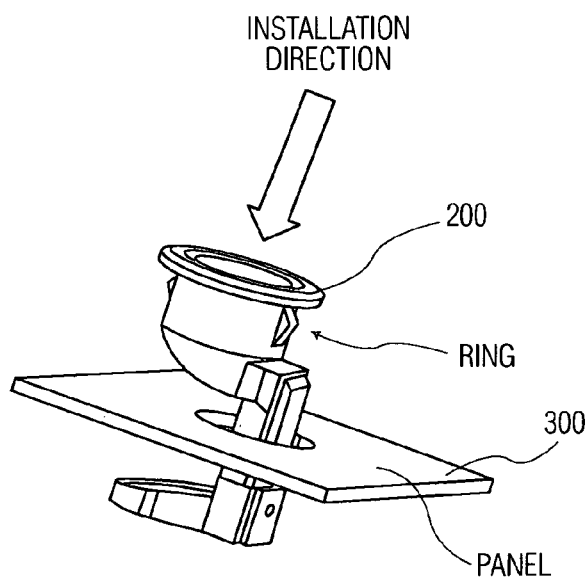
FIG. 6 shows a second embodiment of the present invention having a mounting ring that combines the functions of the isolation sleeve and mounting ring of the embodiment of FIG. 2.

FIG. 6 shows a second embodiment of the invention that includes an integral isolation sleeve/mounting ring. This second embodiment eliminates the need for a separate isolation sleeve by incorporating the isolation feature into the mounting ring.

Figure 7A:
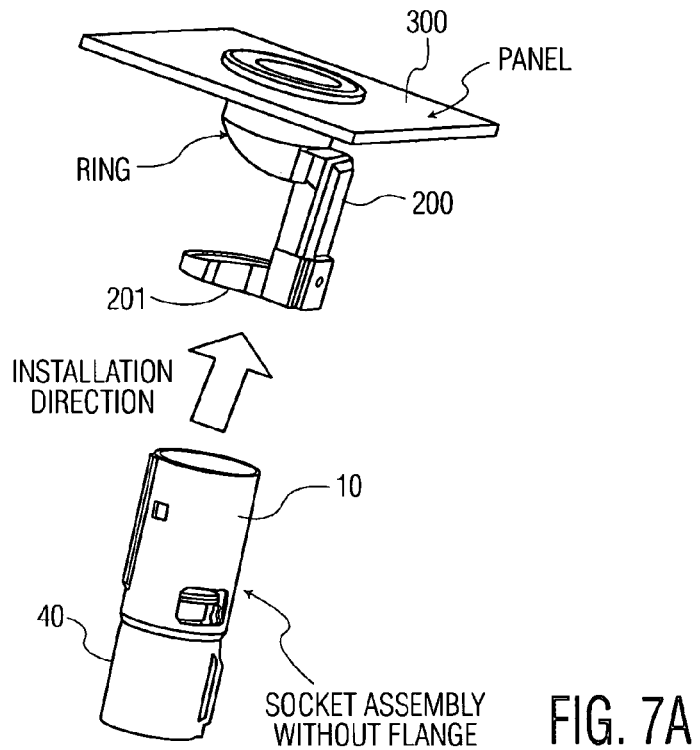
FIG. 7A shows the assembly of the socket into the integral mounting ring/isolation sleeve of FIG. 6 according to the present invention.
Figure 7B:
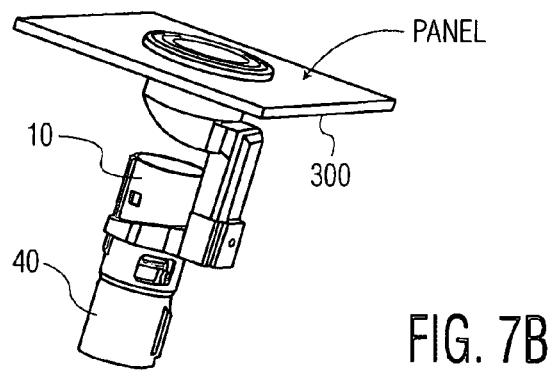
FIG. 7B shows a further step in the assembly of the second embodiment.
Figure 8:
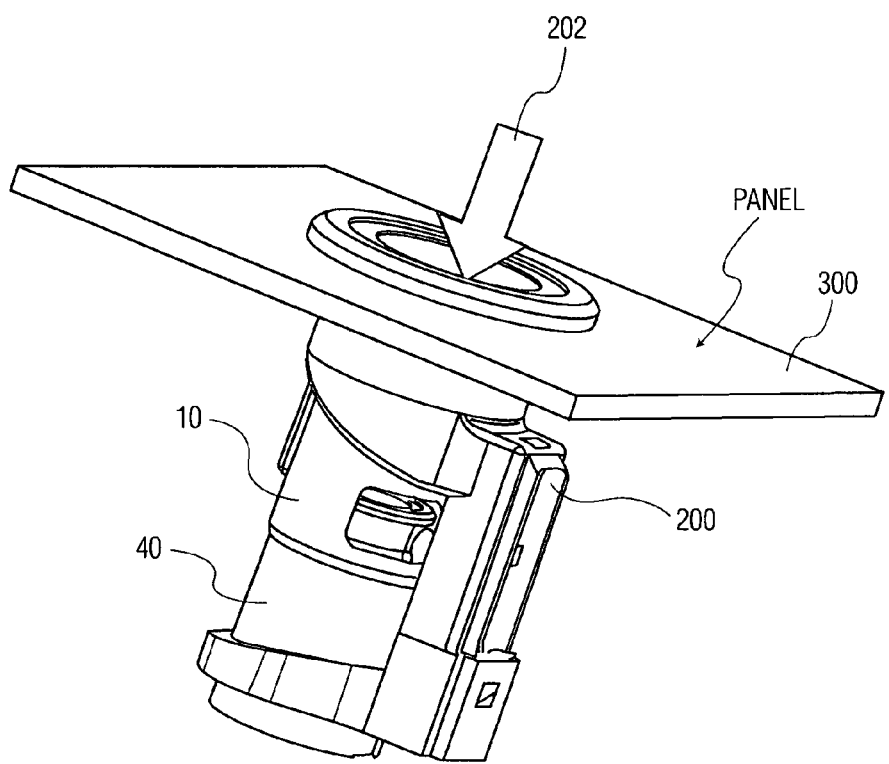
FIG. 8 shows a perspective view of the second embodiment fully assembled.

The isolation sleeve/mounting ring 200 shown in FIG. 6 is installed into an opening of the vehicle panel 300 from in front of the panel as shown. Then, as shown in FIG. 7A, once the isolation sleeve/mounting ring 200 is fully seated into the opening in the panel, the socket assembly is installed from the rear of the panel into the isolation sleeve/mounting ring 200. The socket well portion 10 with connector part 40 mounted thereto is inserted into a rearward ring portion 201 of the isolation sleeve/mounting ring (see FIG. 7B) and is seated within the isolation sleeve/mounting ring 200 as shown in FIG. 8. Preferably, once fully seated, the socket will sustain greater than 260 Newtons axial force in the direction of arrow 202. When the socket is fully seated, it is locked into the mounting ring 200 and the mounting ring in turn is locked into the panel 300. Details of this locking mechanism are shown in FIG. 9.

Figure 9:
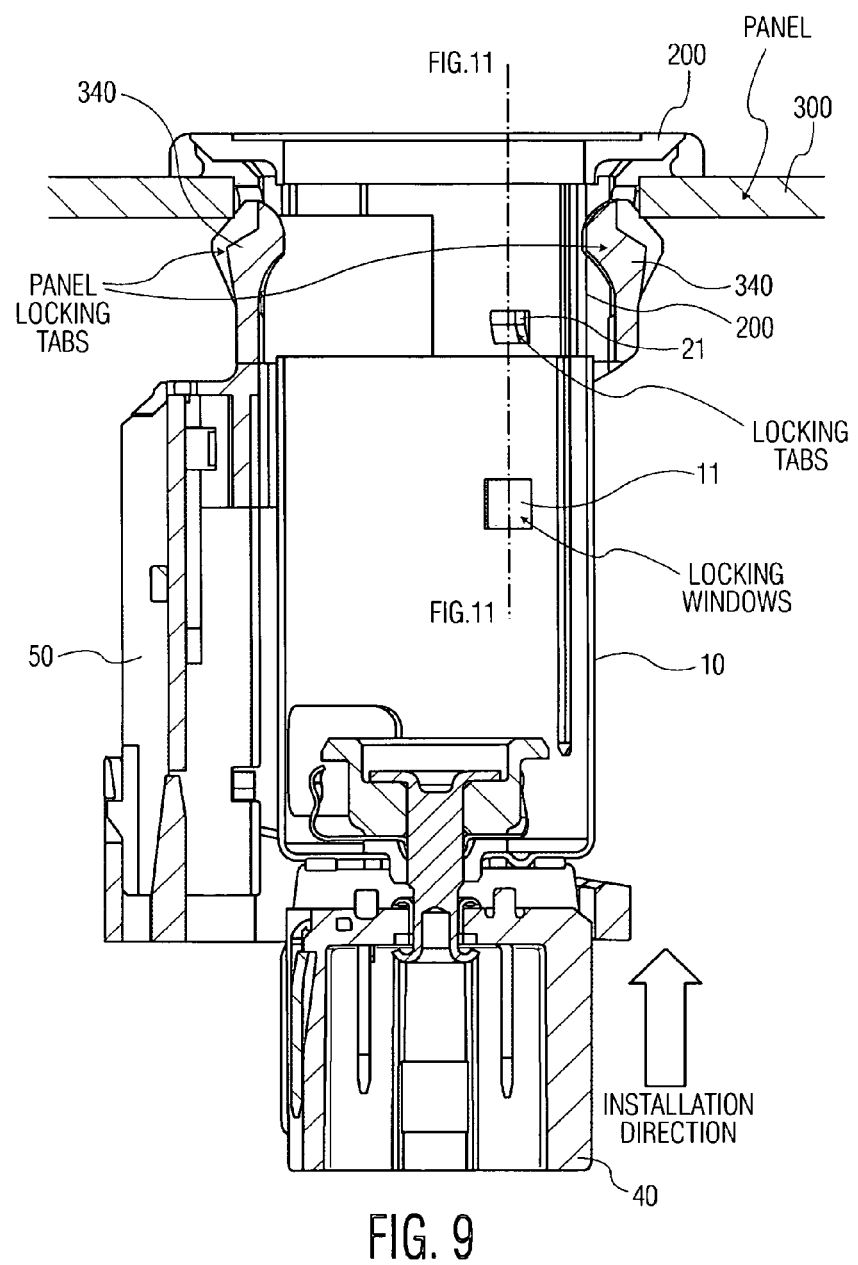
FIG. 9 shows a cut-away view of the second embodiment during assembly of the socket into the integral mounting ring/isolation sleeve.

With reference to FIG. 9, socket well portion 10 with connector portion 40 attached thereto is inserted from the rear of the panel into the isolation sleeve/mounting ring 200 so that the locking windows 11 of well portion 10 align with the locking tabs 21 of mounting ring 200, as shown.

Figure 10:
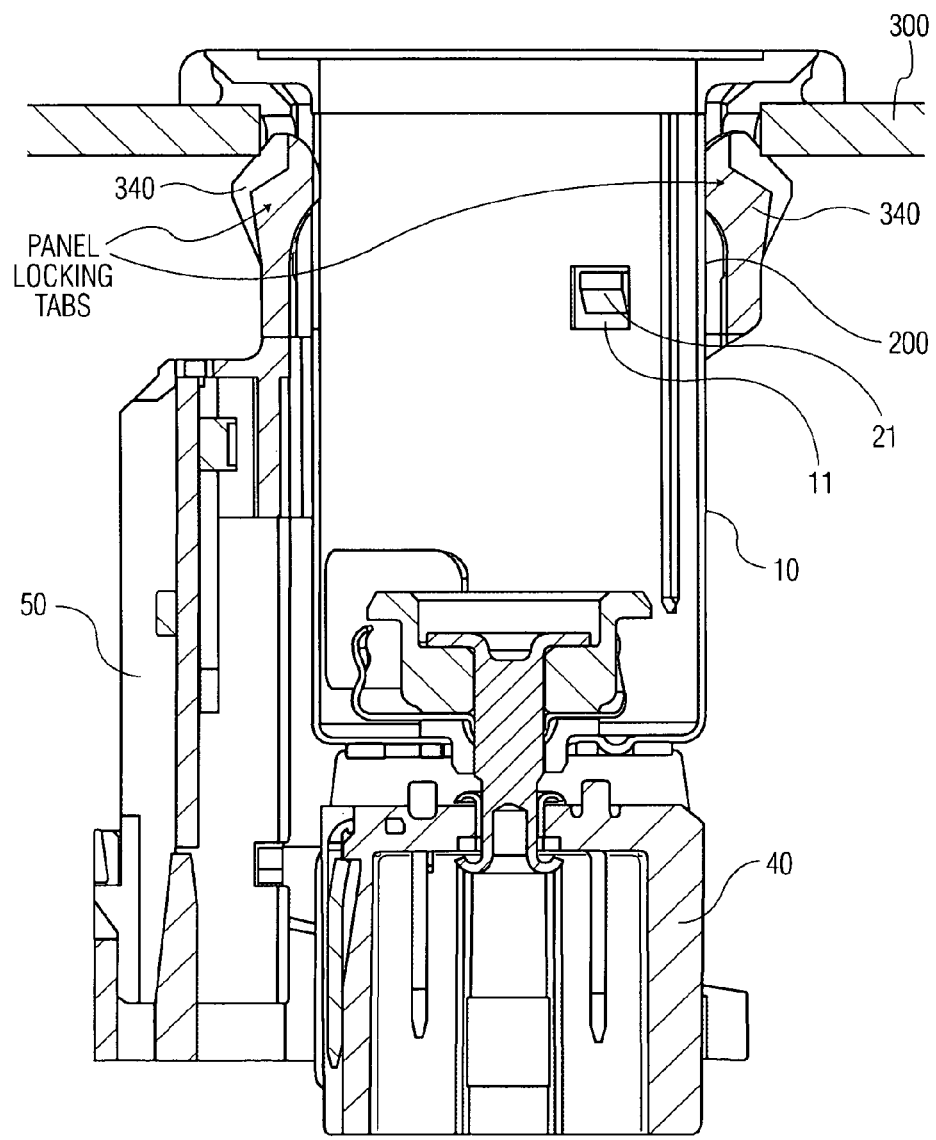
FIG. 10 is a cut-away view of the second embodiment showing the socket fully seated in the mounting ring/isolation sleeve of the second embodiment.

With reference to FIG. 10, as the well portion 10 is inserted into the isolation sleeve/mounting ring 200, the well portion 10 also engages the panel locking tabs 340 of the ring 200. The locking tabs 340 are pressed radially outwardly against the opening in the vehicle panel 300 thereby securing the isolation sleeve/mounting ring 200 to the vehicle panel and thereby securing the socket assembly in the vehicle panel. When the well portion 10 is fully inserted into the isolation sleeve/mounting ring, the well portion 10 pushes the panel locking tabs 340 radially outwardly against the vehicle panel 300 securing the ring 200 to the vehicle panel.

The ring 200 may also include a mounting structure 50 for receiving an illumination device, e.g. a lamp or LED for illuminating the ring 200, which may be light conductive to aid in locating the socket in a darkened automobile interior.

Figure 11:
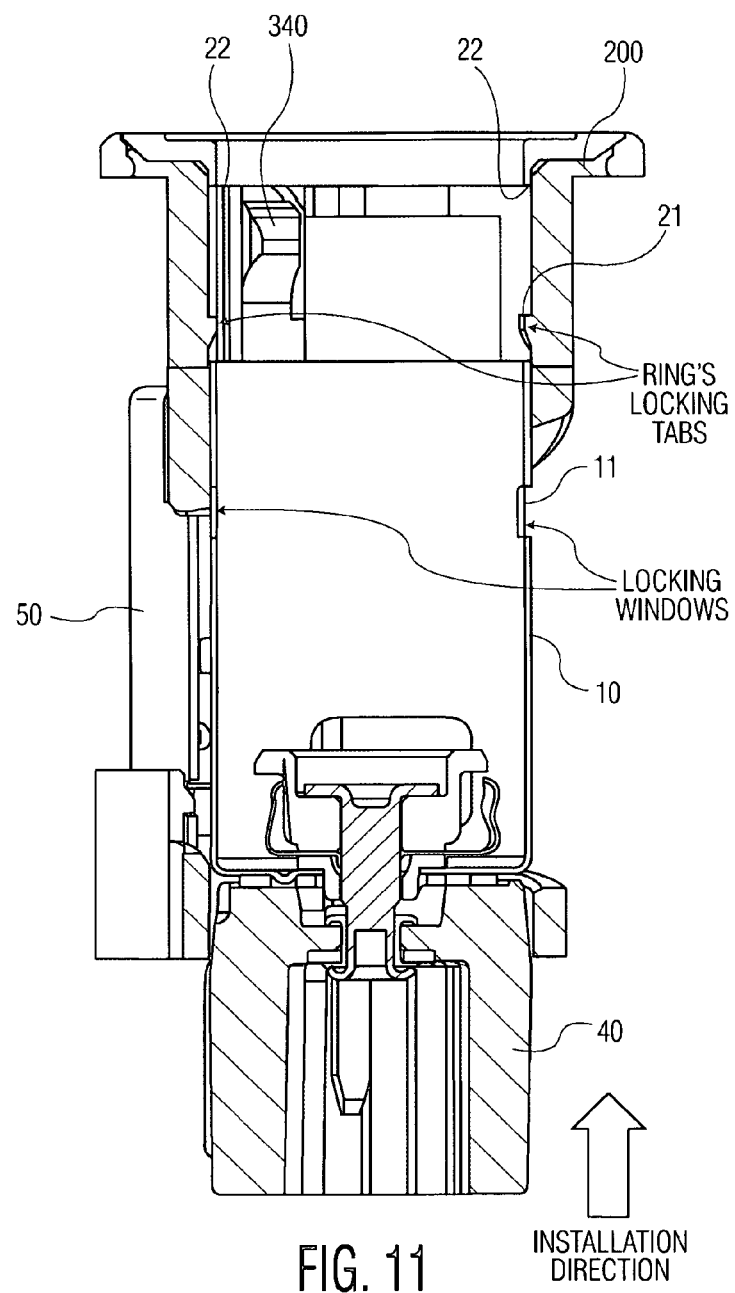
FIG. 11 shows details during assembly of the socket in the mounting ring/isolation sleeve of the second embodiment from a different viewing angle.

FIG. 11 shows, in a different cross-section taken along lines 11-11 of FIG. 9, the socket when the socket well portion 10 is being inserted into the isolation sleeve/mounting ring 200. The view of FIG. 11 is thus taken cut through the locking tabs 21 and locking windows 11 and shows the socket well portion 10 just before it engages the locking tabs 21.

Figure 12:
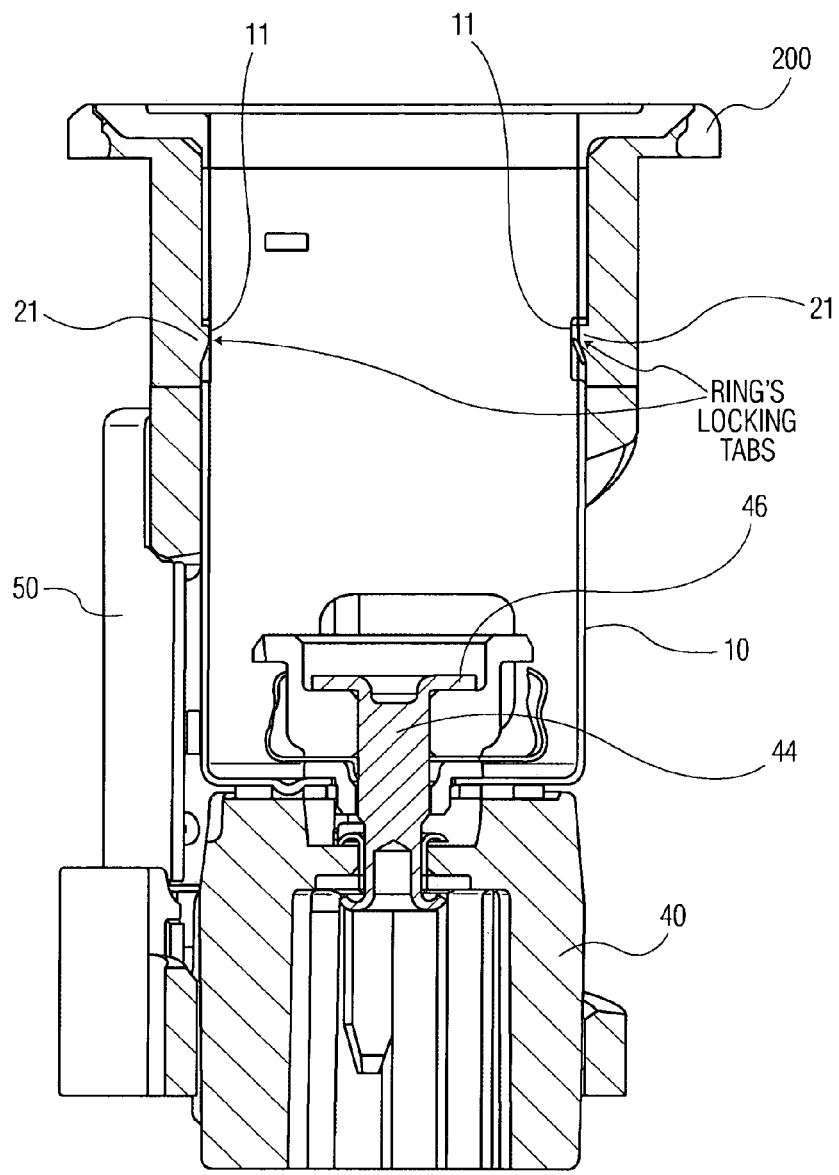
FIG. 12 shows a cut-away view of further details of the second embodiment fully assembled.

FIG. 12 shows the well portion 10 fully inserted, with the locking tabs 21 of the isolation sleeve/mounting ring locked into the locking windows 11 of the socket well portion 10.

A long metallic object inserted into the socket and contacting simultaneously the center contact 46 and the flange of the socket at A (FIG. 12) near the opening into the socket will not cause a short circuit because the flanged area is a part of the non-conductive isolation sleeve/mounting ring 200, as in the first embodiment.

Figure 13:
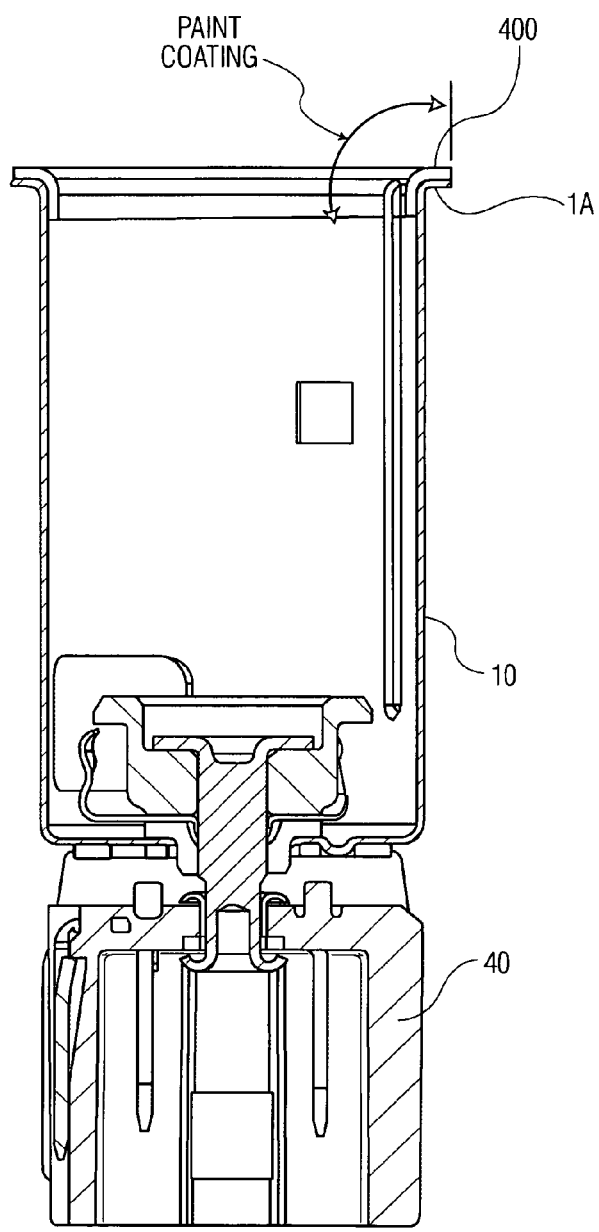
FIG. 13 shows a third embodiment according to the present invention.

FIG. 13 shows another embodiment wherein the socket well portion 10 is made in accordance with the prior art to include a flanged outer portion 1A. However, in this embodiment, a nonconductive layer or coating 400 is provided at the flange 1A around the entire perimeter of the flange to prevent a metallic object from making electrical contact at the flange area. Layer 400 may comprise a non-conductive paint or a layer of plastic or other nonconductive material deposited, glued onto or otherwise adhered to the flanged area to prevent electrical contact from being made in that area.

Figure 14:
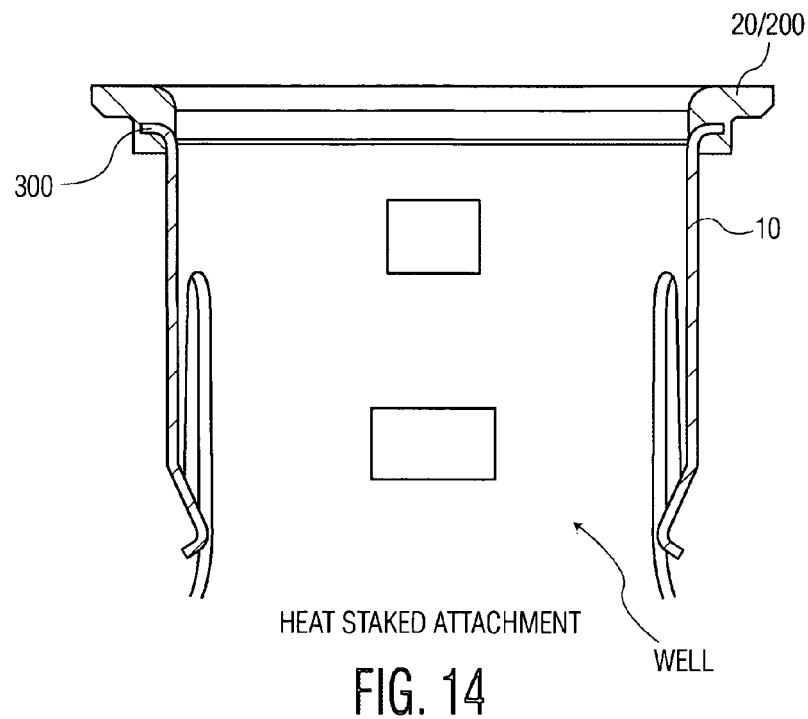
FIG. 14 shows an alternate embodiment of the upper isolation sleeve that uses a heat staking to mount it to the metal socket well.

FIG. 14 shows an embodiment wherein the upper isolation sleeve 20/200 is heat staked to the socket well 10. Thus, the well is provided with a flange or tangs 300 via which the isolation sleeve 20/200 is heat staked to the flange/tangs 300 by the known process of heat staking whereby the metal part is affixed to the sleeve by pressing it into the plastic part while heat is applied to either the metal or plastic part.

Figure 15:
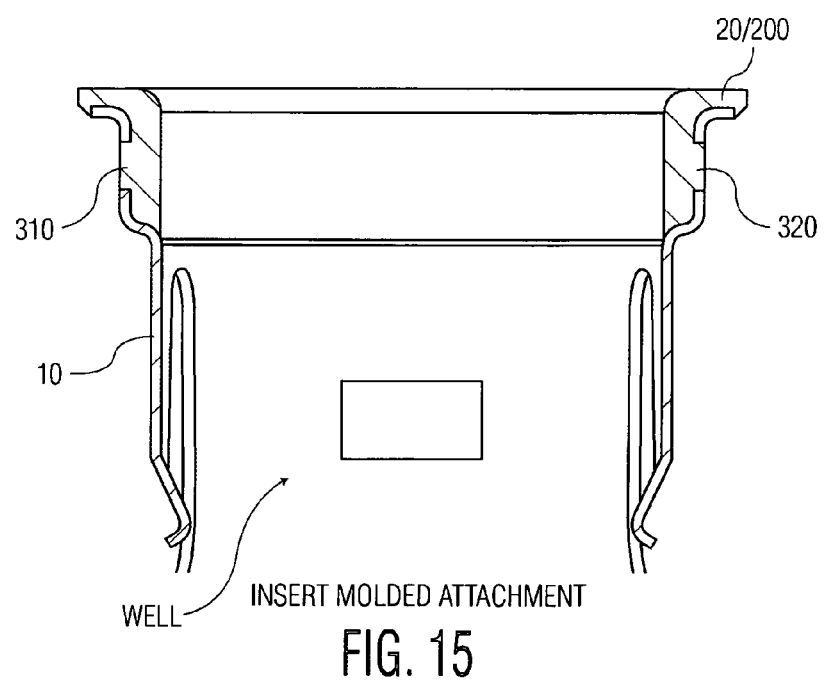
FIG. 15 shows another alternative embodiment using an insert molding method to mount the isolation sleeve to the socket well.

FIG. 15 shows another embodiment wherein the sleeve 20/200 is affixed to the socket well 10 by the known process of insert molding, that is by molding the sleeve in place so that it flows into openings 310 in the socket well 10, thus securing it.

FIGS. 16A and 16B and 17A and 17B show additional embodiments for use with socket wells 10' having an outwardly extending flange 10A. In these embodiments, the socket well 10' has a step 321 to a proximal region 10B of enlarged diameter as compared to the region 10C. The UIS 20/200 is received in the region 10B with a snap fit and prevents conductive objects mistakenly inserted into the socket well that engage with the center conductive contact from electrically engaging with the region 10B and the flange 10A of the socket well.

Figure 16A:
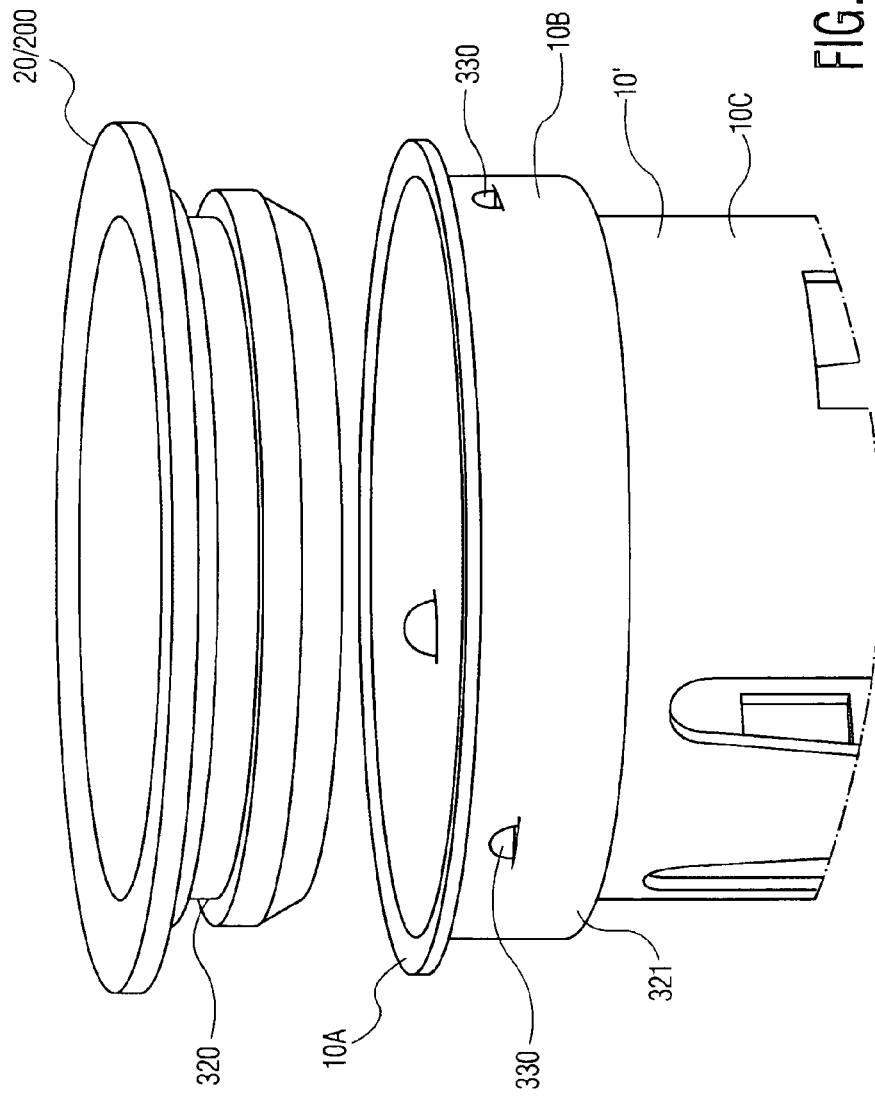

According to the embodiment of FIGS. 16A and 16B, a circular notch 320 is formed in the outer periphery of the UIS 20/200 as shown in FIG. 16A. The notch 320 is shown in cross section in FIG. 16B. As shown in FIGS. 16A and 16B, the socket well 10' includes inwardly projecting tangs or flange 330. The UIS 20/200 is placed over the socket well 10' as in FIG. 16A and snapped into it so that the flexible tangs 330 are received in the circular notch 320, thus securing it into the well. This provides a simple assembly procedure. There is no rotation stop (so the UIS 20/200 could rotate in the well), although one could be provided if desired.

FIGS. 16C and 16D show another embodiment. In this embodiment, the UIS 20/200 has a plurality of outwardly projecting snap tabs 331 that are received in openings 332 in well 10'. The UIS 20/200 also preferably has an alignment slot 334 that must be aligned with a tab or dimple 335 in the socket well 10' to allow it to be inserted into the well with the tabs 331 and openings 332 aligned. In this embodiment, the interlocking parts operate as a rotation stop.

The present invention solves the problem of electrically conductive lengthy objects, such as, keys, metallic pens or tools that are inserted into the socket and make contact with the positive supply contact from also contacting the ground contact near the opening in the socket and causing a short circuit.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An electrical power socket comprising:
a well having an electrically conductive well portion having a proximal and a distal end;
a connector part for receiving electrical connections to an electrical power supply disposed at the distal end of the well portion;
a first electrical contact being provided in electrical isolation from the well portion at the distal end of the well portion, the first electrical contact being electrically connected to a first electrical connection of the connector part;
the well portion being electrically connected to a second electrical connection of the connector part; and
an electrically insulating sleeve portion being provided at the proximal end of the well portion forming an electrically insulating portion of the well, the sleeve portion adapted to be disposed in an opening in a receiving panel, whereby the insulating sleeve portion prevents an electrically conductive foreign object that is inserted in the well and electrically contacts the first electrical contact from simultaneously making electrical contact with the electrically conductive well portion.

2. The socket of claim 1, wherein the sleeve portion comprises a separate part from said well portion that engages with the well portion and forms a continuation of said well portion and provides an opening for receiving an electrical connector plug or cigar lighter.

3. The socket of claim 2, wherein the sleeve portion comprises a recessed portion on an inner diameter thereof for receiving said well portion such that the well portion is received with a flush mount on the inside surface of the sleeve portion.

4. The socket of claim 2, further comprising a mounting ring concentrically received about the sleeve portion for mounting the socket in the panel opening.

5. The socket of claim 4, wherein the sleeve portion and mounting ring comprise an integral member.

6. The socket of claim 4, wherein the well portion has at least one locking window and the sleeve portion has at least one flexible locking tab for securely engaging in the window when the well portion is inserted into the sleeve portion, thereby securely locking the well portion to the sleeve portion.

7. The socket of claim 6, wherein the mounting ring has at least one flexible locking tab and the sleeve portion has at least one locking window, the locking tab being received in the locking window when the sleeve portion is received in the mounting ring for securely locking the sleeve portion in the mounting ring.

8. The socket of claim 7, wherein the mounting ring has at least one flexible panel locking tab for engaging behind a panel when the mounting ring is inserted into the panel opening to secure the mounting ring in the panel.

9. The socket of claim 8, wherein the sleeve portion has a longitudinally disposed keying member for aligning with a key member of the mounting ring to position the sleeve portion in a fixed orientation with respect to the mounting ring.

10. The socket of claim 4, wherein the mounting ring is adapted to be inserted into the panel opening from the front of the panel, the sleeve portion and well portion thereafter being installed in the mounting ring from the front of the panel.

11. The socket of claim 5, wherein the integral sleeve portion and mounting ring is inserted into said panel opening from the front of said panel and said well portion is inserted into said integral sleeve portion and mounting ring from the rear of said panel.

12. The socket of claim 1, wherein said well portion does not have a flange at its proximal end so that it can be received flush within said sleeve portion, the sleeve portion having a recessed undercut on its inner diameter with a stop shoulder at a proximal end thereof forming an end of travel feature to prevent further movement of said well portion into said sleeve portion when the well portion is assembled into said sleeve portion.

13. The socket of claim 4, wherein the mounting ring comprises an illumination ring that is illuminated by a light source mounted on said mounting ring.

14. The socket of claim 5, wherein the integral sleeve portion and mounting ring comprises an illumination ring that is illuminated by a light source mounted on said mounting ring.

15. The socket of claim 1, wherein the well portion has a flange at the proximal end, the electrically insulating sleeve portion comprising an electrically insulating coating arranged about said flange.

16. The socket of claim 15, wherein the electrically insulating coating comprises an electrically insulating paint.

17. The socket of claim 1, wherein the well portion comprises a one piece member extending from said proximal end to the distal end where the connector part is attached to the well portion.

18. The socket of claim 2, wherein the sleeve portion is heat staked to the well portion.

19. The socket of claim 2, wherein the sleeve portion is insert molded to the well portion.

20. The socket of claim 2, wherein the sleeve portion is a snap-fit into the well portion.

21. The socket of claim 20, wherein the sleeve portion comprises a circular peripheral notch that receives radial tangs of the well portion.

22. The socket of claim 20, wherein the well portion has a step to an enlarged diameter at the proximal end for receiving the sleeve portion in the well portion.

23. The socket of claim 20, wherein the well portion has windows that receive outwardly projecting radial tangs of the sleeve portion to lock the sleeve portion in the well portion.

* * * * *